United States Patent Office 3,491,095
Patented Jan. 20, 1970

---

3,491,095
3,6-DIOXO-4-PYRIDAZINE ACETIC ACID DERIVATIVES
Kurt Knoevenagel and Rolf Himmelreich, Grunstadt, Pfalz, Germany, assignors to C. F. Spiess & Sohn, Grunstadt, Pfalz, Germany, and Norddeutsche Affinerie, Hamburg, Germany
No Drawing. Filed Dec. 9, 1966, Ser. No. 600,361
Claims priority, application Germany, Dec. 10, 1965, N 27,744
Int. Cl. C07d *51/04*; A01n *9/22*
U.S. Cl. 260—250                    26 Claims

ABSTRACT OF THE DISCLOSURE

This specification describes a class of compounds having the formula:

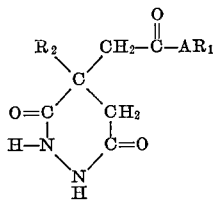

wherein A is oxygen or —NH—, $R_1$ is hydrogen or a lower alkyl radical having up to about 6 carbon atoms, $R_2$ is hydrogen, hydroxyl or

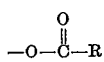

wherein R is an alkyl group having up to about 6 carbon atoms, an alkenyl group having up to about 6 carbon atoms or a phenylene group; and $R_1$ and $R_2$ can together constitute a methylenoxy bridge. This class of compounds is produced by the reaction of monoesters of tricarboxylic acids of the formula:

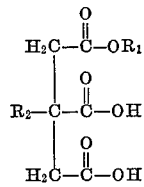

wherein $R_1$ and $R_2$ have the same definitions as above, with hydrazine hydrate.

---

This invention relates to a novel class of compounds which are useful in the regulation of the growth of plants. It more particularly refers to such class of compounds which are useful to retard plant growth.

It is known that maleic acid hydrazide and its N-substituted derivatives are effective plant growth inhibiting agents (see for example, German Patent 815,192 and German Auslegeschrift 1,148,807). Unfortunately, these known maleic acid derivatives have been known to be harmful to plants treated to a greater extent than desired and in ways other than growth inhibition. Since these growth retardation agents are especially directed toward use with grass in order to slow down growth rate and therefore reduce the necessity for frequent cutting, it is particularly unfortunate that some of the bad side-effects have been noticed with grass.

It is therefore an object of this invention to provide a novel class of compounds which are effective plant growth regulating agents.

It is another object of this invention to provide a novel means of retarding plant growth.

It is a further object of this invention to provide a novel means of delaying the blooming of ornamental plants.

It is a still further object of this invention to provide a novel means for encouraging the formation of branches and other new growth on plants.

Other and additional objects of this invention will become apparent from a consideration of this entire specification, including the claims appended hereto.

In accord with and fulfilling these objects, one aspect of this invention resides in a class of compounds of the formula

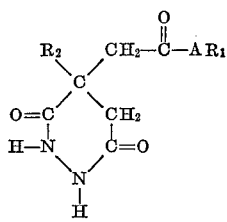

wherein A is oxygen or —NH—, $R_1$ is a member selected from the group consisting of hydrogen and a lower alkyl group having up to about 6 carbon atoms; $R_2$ is a member selected from the group consisting of hydrogen, hydroxy and acyloxy; and wherein $R_1$ and $R_2$ taken together can be a methylenoxy bridge. The aryl portion of the benzoyloxy, and chlorbenzoyloxy group may be exemplified by phenyl, naphthyl, tolyl, xylyl, t-butyl phenyl, anthracyl, biphenylyl, etc.

The compounds of this invention can exist in various tautomeric forms such as

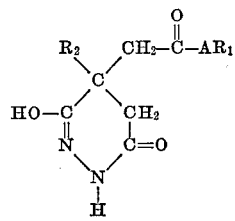

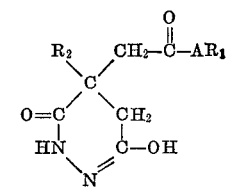

or

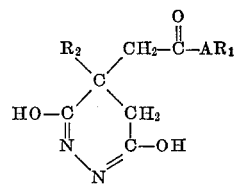

and in fact any given quantity of such class may contain some quantity of one or more of these four tautomeric forms. An equilibrium concentration of all four forms may be present. This invention is not dependent upon any particular tautomer.

The compounds of this invention can be prepared by the reaction of hydrazine or hydrazine hydrate or other similar hydrazide forming material with a tricarboxylic acid or derivative thereof having the formula:

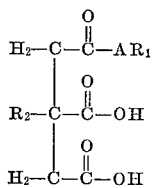

wherein $R_1$ and $R_2$ have the same definition as set forth above. This reaction may be carried out by reacting hydrazine and a carboxylic acid. It is suitable to react these materials in a reaction solvent and at elevated temperatures. It is often convenient to react these materials at the boiling point of the reaction solvent. Suitable solvents are those materials which do not take part in the reaction, do not react with either the hydrazine, the acid or the hydrazide product, are liquid at room temperature, and have a boiling point under about 150° C. Water has been found to be a particularly good reaction solvent. It is preferred to carry out the reaction with highly concentrated solutions of reactants since it has been found that the ease of reaction and speed of reaction increase with increases reactant concentrations. It is therefore apparent that the most preferred reaction conditions utilize reactants dissolved in the reaction solvent to the limit of their solubility. If desired, the course of the reaction can be followed by periodic or continuous titration of the reaction mixture with lye. The reaction is catalyzed by heavy metals and their salts. These metals are generally multivalent and include iron, copper, vanadium, silver, nickel, cobalt, palladium, etc. The metal salt anions may be organic or inorganic, e.g., chloride or citrate. It is particularly preferred to carry out this reaction in a vessel made of a metal which catalyzes this reaction, such as steel, in order to improve the results obtained.

It is within the scope of this invention to provide the compounds of this invention as ester, amide or anhydride derivatives without detracting from their utility. Esterification can be carried out by merely adding excess alcohol to an aqueous solution of the compounds of this invention in their acid state. This reaction readily proceeds with cold solutions and is accelerated by heating and/or normal acidic esterification catalysts. Similarly, amidification of the compounds of this invention can be carried out by reaction with amines in the conventional manner under the usual reaction conditions. Where the compounds of this invention have one free carboxylic acid group and a free hydroxyl group, they may be dehydrated in the usual way to form anhydrides or lactones, as the case may be. It is further within the scope of this invention to utilize these compounds in their salt form either as acid salts or as alcoholates (enol form) or both, as the case may be. Such salts and/or alcoholates are fully operative within the specialized utility of the class of compounds of this invention set forth above and more particularly described and discussed below. Multiple salts, partial salts and mixed ester, amide and/or salt combinations are also possible within the scope of this invention.

The following compounds are generally exemplary of specific compounds within the scope of this invention:

3,6-dioxo-hexahydro-pyridazinyl-(4)-acetic acid;
3,6-dioxo-hexahydro-pyridazinyl-(4)-acetic acid methyl ester;
4-hydroxy-3,6-dioxo-hexahydro-pyridazinyl-(4)acetic acid;
4-hydroxy-3,6-dioxo-hexahydro-pyridazinyl-(4)-acetic acid methyl ester;
4-hydroxy-3,6-dioxo-hexahydro-pyridazinyl-(4)-acetic acid ethyl ester;
4-acetyl-oxy-3,6-dioxo-hexahydro-pyridazinyl-(4)-acetic acid;
4-n-propionyl-oxy-3,6-dioxo-hexahydropyridazinyl-(4)-acetic acid;
4-iso-butyroyl-oxy-3,6-dioxo-hexahydro-pyridazinyl-(4)-acetic acid;
4-n-valeroyl-oxy-3,6-dioxo-hexahydro-pyridazinyl-(4)-acetic acid;
4-iso-valeroyl-oxy-3,6-dioxo-hexahydro-pyridazinyl-(4)-acetic acid;
4-acryloyl-oxy-3,6-dioxo-hexahydro-pyridazinyl-(4)-acetic acid;
4-crotonoyl-oxy-3,6-dioxo-hexahydro-pyridazinyl-(4)-acetic acid;
4-benzoyl-oxy-3,6-dioxo-hexahydro-pyridazinyl-(4)-acetic acid;
4-o-chlorobenzoyl-oxy-3,6-dioxo-hexahydro-pyridazinyl-(4)-acetic acid;
4-cinnamoyl-oxy-3,6-dioxo-hexahydropyridazinyl-(4)-acetic acid;
4-acetyl-oxy-3,6-dioxo-hexahydro-pyridazinyl-(4)-acetic acid methyl ester;
4-acetyl-oxy-3,6-dioxo-hexahydro-pyridazinyl-(4)-acetic acid-n-butylester;
4-acetyl-oxy-3,6-dioxo-hexahydro-pyridazinyl-(4)-acetic acid amyl ester;
4-crotonoyl-oxy-3,6-dioxo-hexahydro-pyridazinyl-(4)-acetic acid methyl ester;
3,6-dioxo-hexahydropyridazine-spiro-(4,6')-4'-hydroxy-1',3'-dioxane;
succinoyl-bis-(4-hydroxy-3,6-dioxo-hexahydro-pyridazinyl-(4)-acetic acid);
4-hydroxy-3,6-dioxo-hexahydro-pyridazinyl-(4)-acetamide.

It is still further within the scope of this invention to form adducts of any of the compounds hereinbefore described having at least one free carboxyl group with one or more acid, aldehyde, ketone, cyclic ether, and/or salt. These addition compounds have stoichiometric compositions. They can be considered as addition compounds or as complex compounds. They are easily broken down again into their components by water, or preferably by acids or alkalis.

These addition compounds, too, have similar effects on plants as the fundamental substances, so that it is assumed that they are transformed into the fundamental substances either before their absorption by the plants, or within the plant after absorption.

The addition compounds can be obtained generally by bringing the two components together in stoichiometric quantities either directly or in an indifferent solvent. Most of them are thus obtained in the form of crystalline substances. One solvent which appears particularly suitable is diethyl ether.

Specifically exemplary adducting agents include hydrochloric acid, acetic acid, trichloracetic acid, aminoacetic acid aminosulfonic acid, silicic acid, paraldehyde, propionaldehyde, benzaldehyde, acetone, acetophenone, dimethyl formamide, acetic acid ethyl ester, dioxane, tetrahydrofuran, and dimethylphosphite.

While all of the compounds of this invention have plant growth regulating properties, the effects of these compounds sometimes vary from plant to plant and from specific compound to specific compound. Further, there are many markedly different effects depending upon concentration of application and time of application.

In general, the substances inhibit the growth of plants in a wide range of concentrations, so that the plants treated with the compounds of the invention exhibit a smaller growth. At the same time, the plants are not damaged by these compounds, even when applied in relatively high concentration. After a certain time following application of the compounds of this invention, which is directly proportional to the amount of compound used, the growth rate of the plants returns to normal.

Grasses or cereal plants undergo different inhibition by the substances of the invention, depending on the concentration in which the compounds hereof are used, and depending upon the stage of the growth of the plants at the time they are treated. The formation of the spermatophore is hastened, delayed or even entirely prevented, depending upon the conditions of treatment.

Because of this characteristic, the compounds of this invention can be used, for example, to keep grass short and thus save mowing, or in order to achieve a lower growth rate in the case of ornamentals.

In the case of cereals, a shorter stalk length can be achieved with the compounds of this invention. This brings about a more stable stance to prevent losses due to knock-down under adverse weather conditions.

In the case of many of the plants treated with these compounds, the formation of fresh shoots and new branches is stimulated, too, depending on the time of application. This effect is of interest especially in the cultivation of ornamentals as well as in the raising of cereal crops.

In the growing of cereal crops, the formation of additional shoots is desirable, since this has a favorable effect on the yield in relation to the amount of seed planted. In lawns, too, an increase in the sprouting and branching of grasses is desirable, since this produces a thicker lawn and greater coverage.

In the case of certain broad-leaf plants, treatment with the compounds of this invention produces not only a low growth rate, but also a shift in the time of flowering. A delay in blossoming is often desirable for various reasons both in ornamentals and in crop plants such as vegetables.

If seeds, bulbs or tubers are treated with the substances named, germination and sprouting are delayed. Furthermore, in certain concentrations the substances stimulate the formation of roots, and can be used in a manner similar to $\alpha$-naphthyl acetic acid for the rooting of cuttings.

These compounds and their aqueous solutions are stable and do not decompose even when exposed to light and air. This must be considered as a special advantage.

Special stress must be placed on the fact that the compounds of this invention are very soluble in water. This makes it possible to prepare them in highly concentrated aqueous solutions which appear to be especially advantageous for the application of the substances, particularly as regards leaf absorption and transmission in the plant.

The compounds in which one free carboxyl group and/or a free hydroxyl group is present have a practically unlimited solubility in water and for this reason they exhibit an excellent long-term activity along with a rapid initial effect.

On the other hand, the difficulty soluble salts are especially suitable for the achievement of a long-persisting effect in application to the soil. A combination of an easily soluble compound of the invention with a difficultly soluble salt according to the invention is especially favorable to the achievement of a good initial effect and a sustained action, in many cases.

Examples of salts that are easily soluble in water are the alkali, alkaline earth and ammonium salts as well as the salts of the primary, secondary and tertiary amines, and especially the salts of the alkanolamines, such as those of the ethanolamine, diethanolamine and triethanolamine.

Difficulty soluble salts of the substances of the instant invention are certain heavy metal salts, such as the salts of copper, nickel, lead and mercury, and the salts of the higher alkyl and aryl amines, such as those of laurylamine.

The compounds are new and have not yet been described. The chemical name of the fundamental compound is 3,6-dioxohexahydropyridazinyl-(4)-acetic acid.

The following examples are illustrative of the practice of this invention.

EXAMPLE 1

3,6-dioxo-hexahydro-pyridazinyl-(4)-acetic acid
[$R_1$=H and $R_2$=H in the general formula]

This compound is obtained by boiling an aqueous solution of stoichiometric amounts of tricarballylic acid and hydrazine hydrate (80%) for two hours and then removing the water by vacuum distillation. It is a colorless, viscous, syrupy substance that is easily soluble in water. Yield: 89.3%. A molecular weight of 180.5 is found on the basis of titration (calculated 172). Equivalent weight: Found 86.0. Calculated 86.0.

EXAMPLE 2

4-hydroxy-3,6-dioxo-hexahydro-pyridazinyl-(4)-acetic acid

The starting substance for the manufacture of this compound can be either acetylanhydrocitric acid, citric acid anhydride or citric acid itself.

4200 g. of citric acid hydrate was refluxed for 3.5 hours with 1350 g. of hydrazine hydrate (80%). After this period, 92.2% of this compound had formed. The yield could not be further increased by continued boiling.

210 g. of citric acid hydrate and 62.5 g. of hydrazine hydrate (80%) were refluxed for 2.3 hours with the addition of 0.5 g. of $FeCl_3$ x $6H_2O$. After this period, 92.2% of the compound had formed.

210 g. of citric acid hydrate and 62.5 g. of hydrazine hydrate (80%) were refluxed for 5 hours with the addition of 5 g. of Fe citrate. 96.4% of the compound had formed during this period.

5,250 g. of citric acid hydrate were boiled with 1,562 g. of hydrazine hydrate (80%) in a stainless steel vessel until the end of the reaction. 96.7% of the compound had formed by that time.

210 g. of citric acid hydrate and 62.5 g. of hydrazine hydrate (80%) were refluxed for 3 hours with the addition of 5 g. of powdered copper. During this time 99.6% of the compound had formed.

This compound can be purified in the following manner:

150 ml. of a 65.6% aqueous solution of the compound was diluted with 200 ml. of water, and 8.0 g. of benzaldehyde were added. The mixture was agitated with a magnetic agitator for 3 hours at room temperature. The mixture was then filtered and the filtrate was extracted with ether for 7 hours. The aqueous solution was separated from the ether and concentrated to the dry state in a vacuum at 60° C.

In this manner, 75.3 g. of 4-hydroxy-3,6-dioxohexahydro-pyridazinyl-(4)-acetic acid were obtained in the form of a yellowish, amorphous mass which melts at 92° C. The compound is easily soluble in water. On the basis of titration, a molecular weight of 188.2 was found (calculated 188). Equivalent weight: Found: 94.2. Calculated: 94.0.

The manufacture of salts will now be explained on the basis of 4-hydroxy-3,6-dioxo-hexahydro-pyridazinyl-(4)-acetic acid as an example:

Aqueous soltuions of the mono-, di- and triethanolamine salt and of the diisoamylamine salt of this compound were obtained by simply pouring together aqueous solutions of the compound and equivalent amounts of the bases involved.

Aluminum, copper, manganese and zinc salts were prepared by the precipitation of aqueous solutions of the metal acetate by means of an aqueous soltuion of an equivalent quantity of this compound. In the case of zinc and manganese salt, the solution was buffered with ammonia.

The iron salt of this compound was obtained by boiling an aqueous solution thereof with freshly precipitated iron hydroxide. The antimony salt was prepared by several days of boiling an aqueous solution of this compound with antimony oxide ($Sb_2O_3$). The stannic salt was obtained by the addition of an aqueous solution of $SnCl_2$ plus ammonia.

The data for these salts are listed in the following table:

4-HYDROXY-3,6-DIOXO-HEXAHYDRO-PYRIDAZINYL-(4)-ACETIC ACID

|  | Found | Calculated |
| --- | --- | --- |
| Sodium salt, molecular weight | 201.5 | 210.0 |
| Iron (III) salt (iron content), percent | 9.04 | 9.05 |
| Copper (II) salt (copper content), percent | 14.70 | 14.51 |
| Zinc salt (zinc content), percent | 16.02 | 14.88 |
| Aluminum salt (aluminum content), percent | 4.76 | 4.615 |
| Tin (II) salt (tin content), percent | 23.3 | 24.09 |
| Manganese (II) salt (manganese content), percent | 11.91 | 12.81 |
| Antimony (III) salt (antimony content), percent | 18.47 | 17.83 |

EXAMPLE 3

3,6-dioxo-hexahydro-pyridazinyl-(4)-acetic acid methyl ester

This compound is obtained by letting a solution of the substance of Example 1 stand in a great excess of methanol for 2 hours at room temperature and then removing the methanol. Colorless crystals. M.P. 80° C. Soluble in water. Yield: 54.5%. Equivalent weight: Found: 129.6. Calculated: 127.0.

EXAMPLE 4

4-hydroxy-3,6-dioxo-hexahydro-pyridazinyl-(4)-acetic acid methyl ester 50 ml. of a 65% aqueous solution of the compound of Example 2 is added slowly, drop by drop, to 600 ml. of methanol, with agitation. The mixture is then let stand for 2 hours at room temperature. Then the precipitate is removed with a suction filter, washed with methanol and dried in a desiccator. 31.4 g. of the methyl ester are obtained, in the form of a pale yellow crystalline substance having a melting point of 128° C. to 130° C. Yield: 66.45%. The compound is soluble in water. A molecular weight of 205 was determined on the basis of titration (calculated 202).

EXAMPLE 5

4-hydroxy-3,6-dioxo-hexahydropyridazinyl-(4)-acetic acid ethyl ester

This compound was obtained in the form of colorless crystals by letting a solution of the compound of Example 2 stand in an excess of ethyl alcohol for 2 hours at room temperature and separating the ethyl alcohol. Melting point 128° C. Yield: 79.6%. Soluble in water. A molecular weight of 210 was found on the basis of titration (calculated 216).

EXAMPLE 6

4-acetyl-oxy-3,6-dioxo-hexahydro-pyridazinyl-(4)-acetic acid

Obtained by boiling stoichiometric amounts of acetyl-anhydrocitric acid and hydrazine hydrate (80%) in 3 to 5 times the quantity of glacial actetic acid on the reflux condenser for a period of 5 hours. Then the acetic acid is removed by vacuum distillation and the residue is refluxed with water for an additional 3 hours. After the water is removed by vacuum distillation, the 4-acetyl-oxy-3,6-dioxo-pyridazinyl-(4)-acetic acid is obtained as an amber-yellow, amorphous mass. Yield 90%. This compound is easily soluble in water. A molecular weight of 234 is found on the basis of titration (calculated 230).

Equivalent weight: Found: 116.1. Calculated: 115. Acetyl: Found: 18.4. Calculated 18.69.

EXAMPLE 7

4-n-propionyl-oxy-3,6-dioxo-hexahydro-pyridazinyl-(4)-acetic acid

Obtained by 3-hour boiling of stoichiometric amounts of propionyl-anhydro-citric acid and hydrazine hydrate (80%) in 3 to 5 times the amount of glacial acetic acid for a period of 3 hours. Then the acetic acid is removed by vacuum distillation and the residue is refluxed with water for another 3 hours. After the removal of the water by vacuum distillation, the 4-n-propionyl-oxy-3,6-dioxo-hexahydro-pyridazinyl-(4)-acetic acid is obtained as a yellow, amorphous mass. Yield: 100%. This compound is easily soluble in water.

Equivalent weight: Found: 122.5. Calculated: 122.

EXAMPLE 8

4-iso-butyroyl-oxy-3,6-dioxo-hexahydro-pyridazinyl-(4)-acetic acid

This is obtained by refluxing stoichiometric amounts of isobutyroyl-anhydro-citric acid and hydrazine hydrate (80%) in 3 to 5 times the amount of glacial acetic acid, for a period of 2½ hours. Then the acetic acid is removed by vacuum distillation and the residue is refluxed with water for another 2½ hours. After distilling away the water in vacuo, the 4-iso-butyroyl-oxy-3,6-dioxo-hexahydro-pyridazinyl-(4)- acetic acid is obained as a yellow, amorphous mass. Yield 85.3%. The compound is easily soluble in water.

Equivalent weight: Found: 126. Calculated 129.

EXAMPLE 9

4-n-valeroyl-oxy-3,6-dioxo-hexahydro-pyridazinyl-(4)-acetic acid

Obtained by gently refluxing stoichiometric quantities of n-valeroyl-anhydro-citric acid and hydrazine hydrate (80%) in 3 to 5 times the amount of glacial acetic acid, for a period of 2½ hours. Then the acetic acid is removed by distillation "in vacuo" and the residue is heated with water at a gentle boil for an additional 2½ hours. After removing the water by distillation "in vacuo," the 4-n-valeroyl-oxy-3,6-dioxo - hexahydro - pyridazinyl-(4)-acetic acid is obtained as an amber-yellow, viscous, syrupy liquid. Yield: 95.2%. The compound is soluble in water. On the basis of titration, the molecular weight is found to be 276 (calculated 272).

Equivalent weight: Found: 135.6. Calculated: 136.

EXAMPLE 10

4-iso-valeroyl-oxy-3,6-dioxo-hexahydro-pyridazinyl-(4)-acetic acid

Obtained by the gentle refluxing of stoichiometric amounts of iso-valeroyl-anhydro-citric acid and hydrazine hydrate (80%) in 3 to 5 times the amount of glacial acetic acid, for a period of 3 hours. Then the acetic acid is removed by distillation "in vacuo" and the residue is heated with water to a gentle boil for another 3 hours. After removal of the water by distillation "in vacuo," the 4-iso-valeroyl-oxy-3,6-dioxo-hexahydro - pyridazinyl-(4)-acetic acid is obtained as a yellow-brown, viscous, syrupy liquid. Yield: 98.3%. The compound is soluble in water. The molecular weight is found to be 258 by titration (calculated 272).

Equivalent weight: Found 142.5. Calculated: 136.

EXAMPLE 11

4-acryloyl-oxy-3,6-dioxo-hexahydro-pyridazinyl-(4)-acetic acid

Obtained by the gentle refluxing of stoichiometric amounts of acryloyl-anhydro-citric acid and hydrazine hydrate (80%) in 3 to 5 times the amount of glacial acetic acid, for a period of 2½ hours. Then the acetic acid is removed by distillation "in vacuo," and the residue is heated with water at a gentle boil for another 2½ hours. After removing the water by distillation "in vacuo," the 4-acryloyl-oxy-3,6-dioxo - hexahydro - pyridazinyl-(4)-acetic acid is obtained as a yellow-brown, viscous, syrupy liquid. Yield: 81.0%. The compound is soluble in water.

Equivalent weight: Found: 115.5. Calculated: 121.

EXAMPLE 12

4-crotonoyl-oxy-3,6-dioxo-hexahydro-pyridazinyl-(4)-acetic acid

Obtained by the gentle refluxing of stoichiometric amounts of crotonoyl-anhydro-citric acid and hydrazine hydrate (80%) in 3 to 5 times the amount of glacial acetic acid for a period of 1½ hours. Then the acetic acid is removed by distillation "in vacuo" and the residue is heated at a gentle boil with water for another 1½ hours. After removal of the water by distillation "in vacuo," the 4-crotonoyl-oxy-3,6-dioxo-hexahydro-pyridazinyl-(4)-acetic acid is obtained as a yellow-brown, amorphous mass. Yield: 78.2%. The compound is soluble in water.

Equivalent weight: Found: 127.5. Calculated: 128.

EXAMPLE 13

4-benzoyl-oxy-3,6-dioxo-hexahydro-pyridazinyl-(4)-acetic acid

Obtained by heating stoichiometric amounts of benzoyl-citric acid-trimethylester and hydrazine hydrate (80%) at 120° C. for a period of 15 hours. The 4-benzoyl-oxy-3,6 - dioxo - hexahydro - pyridazinyl - (4) - acetic acid is obtained as a colorless, viscous, syrupy liquid. Yield 59.2%. The compound is difficultly soluble in water. On the basis of titration, a molecular weight of 289 is found (calculated 292).

Equivalent weight: Found: 101.2. Calculated: 97.3.

EXAMPLE 14

4-o-chlorobenzoyl-oxy-3,6-dioxo-hexahydro-pyridazinyl-(4)-acetic acid

Obtained by gentle refluxing of stoichiometric amounts of o - chloro - benzoyl - anhydro - citric acid and hydrazine hydrate (80%) in 3 to 5 times the amount of glacial acetic acid for a period of 2 hours. The acetic acid is then removed by distillation "in vacuo" and the residue is heated with water for another 2 hours at a gentle boil. After removing the water by distillation "in vacuo," the 4 - o - chlorobenzoyl - oxy - 3,6 - dioxo - hexahydro-pyridazinyl - (4) - acetic acid is obtained as a colorless crystalline substance with a melting point of 130° C. Yield: 64.15%. The compound is difficultly soluble in water.

Chlorine Found: 10.42. Calculated: 10.86.

EXAMPLE 15

4-cinnamoyl-oxy-3,6-dioxo-hexahydro-pyridazinyl-(4)-acetic acid

Obtained by gentle refluxing of stoichiometric amounts of cinnamoyl - anhydro - citric acid and hydrazine hydate (80%) in 3 to 5 times the amount of glacial acetic acid for a period of 2½ hours. Then the acetic acid is removed by distillation "in vacuo" and the residue is heated with water at a gentle boil for another 2½ hours. After the water is removed by distillation "in vacuo," the 4-cinnamoyl - oxy - 3,6 - dioxo - hexahydro - pyridazinyl - (4)-acetic acid is obtained as a pale yellow, viscous, syrupy substance. Yield: 92.2%. The compound is difficultly soluble in water.

Equivalent weight: Found: 147.5. Calculated:159.

EXAMPLE 16

4-acetyl-oxy-3,6-dioxo-hexahydro-pyridazinyl-(4)-acetic acid methyl ester

This compound is obtained by 2 to 4 hours of gentle refluxing of stoichiometric amounts of acetyl-anhydro-citric acid methyl ester or acetyl citric acid methylester, or acetyl-citric acid trimethyl ester and hydrazine hydrate (80%) in 3 to 5 times the amount of glacial acetic acid. Acetic acid removed by distillation "in vacuo." Yields are: 95.1%, 28.6%, and 71.4%.

This compound can also be obtained, however, by letting 4 - acetyl - oxy - 3,6 - dioxo - hexahydro - pyridazinyl - (4) - acetic acid stand overnight at rom temperature with 8 times the amount methanol. Yield: 97.1%. Reddish-brown, viscous, syrupy liquid which fluoresces green; soluble in water and soluble in alcohol. On the basis of titration, the molecular weight was found to be 244.2 (calculated 244).

Equivalent weight: Found: 122.9. Calculated: 122.

EXAMPLE 17

4-acetyl-oxy-3,6-dioxo-hexahydro-pyridazinyl-(4)-acetic acid-n-butylester

This compound can be obtained by 2 hours of gentle refluxing of stoichiometric amounts of acetyl-anhydro-citric acid-n-butylester and hydrazine hydrate (80%) in 3 to 5 times the amount of glacial acetic acid. The acetic acid is removed by distillation "in vacuo." Yield: 79.4%. It is an amber-yellow, viscous, syrupy liquid, soluble in water and soluble in alcohol.

Equivalent weight: Found: 140.5. Calculated: 143.

EXAMPLE 18

4-acetyl-oxy-3,6-dioxo-hexahydro-pyridazinyl-(4)-acetic acid amyl ester

This compound can be obtained by 4 hours of gentle refluxing of stoichiometric amounts of acetyl - anhydro-citric acid amyl ester and hydrazine hydrate (80%) in 3 to 5 times the amount of glacial acetic acid. The acetic acid is removed by distillation "in vacuo." Yield: 80.3%. It is an amber-yellow, viscous, syrupy liquid, soluble in water and soluble in alcohol. A molecular weight of 301 is found on the basis of titration (calculated 300).

EXAMPLE 19

4-crotonoyl-oxy-3,6-dioxo-hexahydro-pyridazinyl-(4)-acetic acid methyl ester

This compound can be obtained by 5 hours of gentle refluxing of stoichiometric amounts of crotonoyl-citric acid trimethyl ester and hydrazine hydrate (80%) in 3 to 5 times the amount of glacial acetic acid. The acetic acid is removed by distillation "in vacuo." Yield: 91.45%. It is a colorless, viscous, syrupy substance, soluble in water and soluble in alcohol.

Equivalent weight: Found: 142.0. Calculated: 135.0.

EXAMPLE 20

3,6-dioxo-hexahydro-pyridazine-spiro-(4,6′)-4′-oxo-1′,3′-dioxane

This compound can be produced by gently boiling for 4 hours in aqueous solution of methylene-citric acid and hydrazine hydrate (80%) plus 10% excess. The water is removed by distillation "in vacuo." Yield: 88.25%. It is an amber-yellow, amorphous mass that is soluble in water.

Equivalent weight: Found: 118.2. Calculated: 118.0.

If the formula given in Beilstein for methylene-citric acid is used, a transposition of the methylene bridge from the carboxyl group in the β-position to a corbonyl group in the α-position must take place in the reaction.

EXAMPLE 21

Succinyl-bis-(4-hydroxy-3,6-dioxo-hexahydropyridazinyl-(4)-acetic acid

This compound can be obtained by 3 hours of gentle refluxing of stoichiometric amounts of succinyl-bis-anhydro-citric acid and hydrazine hydrate (80%) in 3 to 5 times the amount of glacial acetic acid. The acetic acid is removed by distillation "in vacuo." Yield: 17.62%. It consists of a colorless crystalline substance having a melting point of 104° C. and is soluble in water.

EXAMPLE 22

Anhydro compound 18.8 g. of 4-hydroxy-3,6-dioxo-hexahydro-pyridazinyl-(4)-acetic acid are very finely powdered and 50 ml. of acetyl chloride are added. The mixture is heated for 5 hours on a steam bath with a reflux condenser equipped with a drying tube. After cooling, the precipitate is removed with a suction filter, washed well with acetyl chloride, and dried in the desiccator. 15.8 grams are obtained of the slightly brownish, crystalline anhydro compound. The substance fuses at 125° C.

Equivalent weight: Found: 84.7. Calculated: 85.0.

EXAMPLE 23

4-hydroxy-3,6-dioxo-hexahydro-pyridazinyl-(4)-acetic acid amide 20.2 g. of 4-hydroxy-3,6-dioxo-hexahydro-pyridazinyl-(4)-acetic acid methyl ester are suspended in 250 ml. of absolute methanol. Ammonia is introduced into this solution, with agitation, until it is saturated. Then the mixture is allowed to stand overnight at room temperature. The mixture is then heated for 3 hours at 50° C. with agitation, using a reflux condenser equipped with a drying tube. After cooling, the precipitate that has formed is removed with a suction filter, washed with methanol and dried in the desiccator. 15.7 grams are obtained of 4-hydroxy-3,6-dioxo-hexahydro-pyridazinyl-(4)-acetic acid amide; in the form of a pale yellow crystalline substance. Melting point: 80° C. The compound is easily soluble in water.

N calculated: 7.49%. N found: 7.81%.

In the following Table 1, exemplary compounds of this invention are set forth together with their physical properties in tabular form:

The compounds of this invention can be absorbed by plants both through their leaves and through their roots. To inhibit plant growth with the compounds of the invention, it is preferable to treat the plants with an aqueous solution of same. The solution can be sprayed, sprinkled or poured on.

The compounds can also be used in emulsion or suspension, or they can be used in powder form alone or admixed with suitable inert solid diluents and/or carriers. Anionic, cationic and non-ionic surface-active agents can also be added to the compounds in order, for example, to achieve better distribution or a better wetting action. Such agents are quite well known and are exemplified by soaps, alkyl sulfonates, alkylaryl sulfonates, quaternary ammonium salts, sugar esters, polyglycol esters, polyalkylene oxides, etc. The addition of a surface-active agent results in a significant intensification of the growth inhibition effect. In many cases, a better effect can be achieved by the addition of sensitizing substances, such as fluorescein, eosin and salts thereof, or by methylene blue and the like. The addition of adhesive agents is also possible.

These compounds can also be used in combination with other plant-protecting agents such as insecticides, selective herbicides, and also with fertilizers, or also with other growth regulating substances.

Combining the substances with traces of certain elements and especially with compounds containing iron, such as iron chelates, appears particularly attractive.

The action of the compounds of the invention is illustrated by the following tests:

6 wheat plants in one pot and 6 oat plants in another pot were treated with an aqueous solution of various

TABLE 1

| Compound of Ex. No. | $R_1$ | $R_2$ | Consistency | Color | Solubility | Molecular weight | Equivalent weight (titration with acid) |
|---|---|---|---|---|---|---|---|
| 1 | H | H | Viscous, syrupy | Colorless | E.s. in water | Calc., 172 / Found, 180.5 | Calc., 86.0. / Found, 86.0. |
| 2 | H | OH | Amorphous powder | Yellow | do | Calc., 188.0 / Found, 188.2 | Calc., 94. / Found, 9. |
| 3 | $CH_3$ | H | Crystalline, M.P. 80° C | Colorless | S. in water | Calc., 127.0 | Calc., 127.0. / Found, 129.6. |
| 4 | $CH_3$ | OH | Crystalline, M.P. 128–130° | Faintly yellowish | do | Calc., 202 / Found, 205 | |
| 5 | $C_2H_5$ | OH | Crystalline, M.P. 128° C | Colorless | do | Calc., 216 / Found, 210 | |
| 6 | H | -acetyloxy | Amorphous mass | Amber-yellow | E.s. in water | Calc., 230 / Found, 234 | Calc., 115 (¹). / Found, 116.1. |
| 7 | H | -n-propionyloxy | do | Yellowish | do | Calc., 122. | Found, 122.5 |
| 8 | H | -isobutyroyloxy | Amorphous powder | Yellow | do | Calc., 129. | Found, 126. |
| 9 | H | -n-valeroyloxy | Viscous, syrupy | Amber-yellow | S. in water | Calc., 272 / Found, 276 | Calc., 136. / Found, 135.6. |
| 10 | H | -iso-valeroyloxy | do | Yellow-brown | do | Calc., 272 / Found, 258 | Calc., 136. / Found, 142.5. |
| 11 | H | -acryloyloxy | do | do | do | Calc., 121. | Found, 115.5. |
| 12 | H | -crotonoyloxy | Amorphous mass | do | do | Calc., 128. | Found, 127.5. |
| 13 | H | -benzoyloxy | Viscous, syrupy | Colorless | D.s. in water | Calc., 292 / Found, 289 | Calc., 97.3. / Found, 101.2. |
| 14 | H | -o-chloro-benzoyloxy | Crystalline, M.P. 134° C | do | do | | (²). |
| 15 | H | -cinnamoyloxy | Viscous, syrupy | Faintly yellowish | do | | Calc., 159. / Found, 147.5. |
| 16 | $CH_3$ | -acetyloxy | Viscous | Reddish brown with green fluorescence. | S. in water / S. in alcohol | Calc., 244 / Found, 244.2 | Calc., 122. / Found, 122.9. |
| 17 | n-butyl | -acetyloxy | Viscous, syrupy | Amber-yellow | S. in water / S. in alcohol | | Calc., 143. / Found, 140.5. |
| 18 | Amyl | do | do | do | S. in water / S. in alcohol | Calc., 300 / Found, 310 | |
| 19 | $CH_3$ | -crotonoyloxy | do | Colorless | S. in water / S. in alcohol | | Calc., 135. / Found, 142.0. |
| 20 | | $CH_2$ | Amorphous mass | Amber-yellow | S. in water | | Calc., 118. / Found, 118.2. |
| 21 | H | -succinoyloxy | Crystalline, M.P. 104° C | Colorless | S. in water | | |
| 22 | | Anhydride | Crystalline, M.P. 125° C | Light brown | E.s. in water | | Calc., 85.0. / Found, 94.7. |
| 23 | $NH_2$ | HO | Crystalline, M.P. 80° C | Pale yellow | do | | (³). |

¹ Acetyl: Calc., 18.69%; Found 18.4%.
² Chlorine: Calc., 10.86%; Found 10.42%.
³ Nitrogen: Calc., 7.49%; Found 7.81%.

ABBREVIATIONS:
E.s.=Easily soluble.
S.=Soluble.
D.s.=Difficultly soluble.

compounds as set forth below at the rate of 10 ml. per pot. The stalk length was measured after 14 days and after 28 days. The growth increase was measured which had taken place since the time of treatment.

In the following tables are listed the percentages of inhibition achieved by the various substances. The percentage of inhibition was calculated on the basis of the following formula:

$$\text{Percentage of inhibition} = 100 - 100 \times \frac{\text{Growth increase of treated plants}}{\text{Growth increase of untreated plants}}$$

Column 2 indicates the percentage of active compound contained in the solutions.

By way of comparison, a 1% solution of maleic acid hydrazide-triethanolamine salt was selected as a control in all experiments. Since in all these control experiments, the plants were all dead after 28 days, the control experiments are not listed in the tables.

TABLE 2.—PERCENTAGE INHIBITION OF GROWTH IN WHEAT AND OATS BY VARIOUS COMPOUNDS

| Compound of example No. | Percent strength of solution | Wheat 14 days | Wheat 28 days | Oats 14 days | Oats 28 days |
|---|---|---|---|---|---|
| 1 | 2 | 68.2 | 57.8 | 68.2 | 54.7 |
| 2 | 2 | 80.2 | 58.7 | 50.9 | 11.3 |
| 2 | 5 | 79.0 | 64.8 | 79.9 | 78.9 |
| 2 | 10 | 81.2 | 78.8 | 78.6 | 75.5 |
| 2 | 20 | 83.6 | 86.9 | 80.1 | 88.2 |
| 3 | 2 | 28.2 | 0.0 | 51.0 | 10.9 |
| 4 | 2 | 34.1 | 11.0 | | |
| 5 | 2 | 62.7 | 13.1 | | |
| 6 | 1 2 | 71.9 | 33.0 | 75.5 | 24.6 |
| 6 | 2 2 | 80.5 | 61.8 | 63.6 | 27.9 |
| 7 | 2 | 3.5 | | 29.5 | |
| 8 | 2 | 54.4 | 28.1 | 55.7 | 13.9 |
| 9 | 2 | 79.2 | 44.6 | 76.8 | 56.1 |
| 10 | 2 | 45.2 | 0 | 73.1 | 12.2 |
| 11 | 1 | 25.5 | 15.5 | 7.6 | 7.6 |
| 12 | 2 | 79.6 | 80.9 | | |
| 13 | 1 | 48.4 | 1.0 | 33.8 | 0 |
| 14 | 1 | 63.4 | 15.1 | 59.6 | 30.8 |
| 15 | 1 | 68.1 | 64.1 | 63.6 | 68.5 |
| 16 | 2 | 72.4 | 71.9 | 53.0 | 25.3 |
| 17 | 2 | 26.9 | 16.3 | 14.0 | 15.5 |
| 18 | 2 | 67.5 | 0 | 73.0 | 36.2 |
| 19 | 2 | 27.5 | 6.7 | 16.3 | 0 |
| 20 | 2 | 80.9 | 59.8 | 78.5 | 71.9 |
| 21 | 2 | 32.8 | 10.9 | 41.7 | 11.9 |
| 22 | 2 | 83.5 | 42.5 | 83.8 | 87.3 |
| 23 | 2 | 74.4 | 1.7 | 63.95 | 0 |

¹ On leaves only.
² On soil only.

INHIBITION OF THE GROWTH OF VARIOUS PLANTS

Various plants were sprayed with 10 ml. each of an aqueous solution of the compounds of Examples 2 and 6 respectively. The commercial preparation maleic acid hydrazide-triethanolamine salt was chosen as the control. After the end of a fairly long time, the inhibition was determined.

The values representing the percentage of inhibition are listed in Table No. 5.

TABLE 5

| Compound of Example No. | Percentage strength of solution | Broad-leaf plantain after 44 days | Orach after 44 days | Corn after 28 days | Sunflower after 50 days |
|---|---|---|---|---|---|
| 2 | 2 | 98.4 | 94.1 | 91.4 | 54.0 |
| 2 | 4 | | | 92.4 | 99.3 |
| 6 | 2 | 89.3 | 67.0 | 30.0 | 71.0 |
| Maleic acid hydrazide triethanolamine salt | 1 | Complete kill | | | |

INHIBITION OF THE GROWTH OF LAWNS

Each section of lawn, having an area of 27.5 square meters, was sprayed with an aqueous solution of the compounds of Examples 2 and 6 respectively. An equal area was left untreated as a control.

After four weeks, the lawn was mowed and the clippings weighed, and the inhibition was determined by comparison with the untreated lawn according to the formula:

$$\text{Inhibition percentage} = 100 - 100 \times \frac{\text{Grass weight/treated lawn area}}{\text{Grass weight/untreated lawn area}}$$

The result was a 71.1% inhibition for the compound of Example 2 and a 76.9% inhibition for the compound of Example 6.

FORMATION OF NEW SHOOTS 6 wheat plants were treated in each case with 10 ml. of 2% aqueous solutions of the various compounds, and after four weeks, the number of additional shoot buds was counted.

The results are compiled in Table 6.

TABLE 3.—PERCENTAGE OF GROWTH INHIBITION IN WHEAT AND OATS BY VARIOUS SALTS OF THE COMPOUND OF EXAMPLE 2

| Salt | Percentage strength of solution | Wheat 14 days | Wheat 28 days | Oats 14 days | Oats 28 days |
|---|---|---|---|---|---|
| Diisoamylamine salt | 1 | 50.8 | | | |
| Diisoamylamine salt with addition of 0.05% Fluorescein-Na | 1 | 75.7 | 5.65 | 83.9 | 37.8 |
| Diisoamylamine salt with addition of 0.025% methylene blue | 1 | 82.8 | 42.4 | 87.1 | 60.7 |
| Diisoamylamine salt with addition of 0.05% eosine yellow | 1 | 65.5 | 13.3 | 90.2 | 37.7 |
| Sodium salt | 2 | 82.15 | 57.8 | 87.53 | 62.9 |
| Iron (III) salt | 2 | 86.85 | 38.9 | 81.0 | 35.2 |
| Copper (II) salt plus free compound | 2 | 4.6 | 6.0 | 0 | 26.3 |
| | 1+1 | 82.3 | 76.39 | 78.52 | 89.89 |
| Monoethanolamine salt | 2 | 88.9 | 77.8 | 88.9 | 94.8 |
| Diethanolamine salt | 2 | 65.4 | 37.0 | 82.3 | 80.9 |
| Triethanolamine salt | 2 | 87.8 | 54.9 | 83.6 | 82.75 |
| Triethylamine salt | 2 | 84.0 | 67.2 | 83.8 | 87.2 |
| Aluminum salt | 2 | 14.6 | 4.8 | 86.6 | 88.4 |
| Antimony salt | 2 | 57.9 | 13.8 | 83.0 | 6.92 |

TABLE 4.—PERCENTAGE GROWTH INHIBITION ON WHEAT AND OATS BY 2% SOLUTIONS OF THE COMPOUND OF EXAMPLE 2 WITH VARIOUS ADDITIVES

| Compound of Example 2 Additive | Wheat 14 days | Wheat 28 days | Oats 14 days | Oats 28 days |
|---|---|---|---|---|
| Product manufactured in an iron vessel | 86.4 | 68.5 | 83.3 | 88.02 |
| With the addition of 0.5% of phenylalkyl sulfonate | 97.3 | 78.8 | | |
| With the addition of 0.5% sodium oleyl methyl tauride | 88.3 | 77.1 | 80.6 | 69.6 |
| With the addition of 0.1% of fluorescein-Na | 77.3 | 37.6 | 82.4 | 67.9 |
| With the addition of 0.1% of eosine blue | 70.7 | 11.8 | 87.5 | 60.6 |
| With the addition of 0.01% methylene blue | 88.0 | 70.5 | 81.5 | 68.3 | a mixture of 0.1% of the finely ground compound of Example 2, and talcum powder. Cuttings which had not been treated, and cuttings which had been treated in like manner with a mixture consisting of 0.1% ground potassium alpha-naphthylacetic acid were used as controls. After 24 days, the cuttings that had not been treated had formed roots with an average length of 3.2 cm. (maximum length 6.1 cm.), the cuttings treated with potassium alpha-naphthylacetic acid had formed roots with an average length of 3.1 cm. (maximum length 6.4 cm.), and the cuttings treated with the compound of Example 2 had formed roots with an average length of 5.5 cm. (maximum length 8.3 cm.).

The following Table 8 lists various illustrative addition agents which form adducts with the compounds of this invention. The physical properties are given for these adducts.

TABLE 6

| Compound of Example No. | Number of additional shoot buds formed per set of 6 plants |
|---|---|
| 1 | 25 |
| 2 | 42 |
| 6 | 10 |
| 16 | 33 |
| Control | 0 |

THE INHIBITION OF THE GERMINATION OF WHEAT 25 grains of wheat were laid on moist sand in dishes in each test. 10 ml. of an aqueous solution of various percentages of the compound of Example 6 were added in each case to the sand. The sand was kept moist thereafter.

The results are compiled in Table 7.

TABLE 7

| Weight percentage of the compound in the solution | Average length of germinated stalks in mm. after 8 days | Percentage of grains germinated after 8 days |
|---|---|---|
| 0.01 | 130 | 94 |
| 0.02 | 125 | 96 |
| 0.05 | 120 | 96 |
| 0.1 | 100 | 94 |
| 0.5 | 60 | 98 |
| 1.0 | 23 | 71 |
| 2.0 | 11 | 58 |
| 5.0 | 7 | 30 |

ROOTING EXPERIMENT

Cuttings were made of chrysanthemum plants; and end of each cutting was dipped in water and then dusted in

TABLE 8.—ADDITION COMPOUNDS

| Compound of Example No. | Addition agent | Molar ratio | Melting point, °C. | Solubility in H₂O | Properties | Grams of compound for which 1 mole of lye is consumed in titration | | Percentage growth inhibition of 2% solution | | | |
|---|---|---|---|---|---|---|---|---|---|---|---|
| | | | | | | Calcd. | Found | Wheat | | Oats | |
| | | | | | | | | 14 days | 28 days | 14 days | 28 days |
| 2 | Hydrochloric acid | 1:1 | | Easily soluble | Yellowish green, amorphous | 74.8 | 74.0 | 88.5 | 63.5 | 83.9 | 85.2 |
| 2 | Acetic acid | 1:1 | 105 | do | Yellowish, crystalline | 124.0 | 120.5 | 80.6 | 60.8 | 73.9 | 70.8 |
| 2 | Trichloracetic acid | 1:1 | | do | Yellow-green, syrupy | 117.2 | 142.2 | 76.3 | C.K. | 69.3 | C.K. |
| 2 | Aminoacetic acid | 1:1 | 89–93 | do | Yellowish, crystalline | N calc., 5.33 N found, 5.90 | | 77.0 | 61.9 | 67.7 | 77.7 |
| 2 | Aminosulfonic acid | 1:1 | 150 | do | Greenish powder | 95.0 | 96.5 | 64.5 | 36.2 | 63.0 | 32.8 |
| 2 | Silicic acid | 1:10 | | Insoluble | White powder | | | 60.9 | | 68.0 | |
| 2 | Paraldehyde | 1:1 | 125 | Water soluble | Yellowish crystalline | 160.0 | 152.0 | 86.8 | 90.0 | 71.5 | 67.5 |
| 2 | Propionaldehyde | 1:1 | 114 | do | Yellowish powder | 246.0 | 227.0 | 81.7 | 28.2 | 85.3 | 90.7 |
| 2 | Benzaldehyde | 1:1 | 110 | do | Ochre powder | 147.8 | 141.8 | 14.6 | | 75.8 | 32.0 |
| 2 | Acetone | 1:1 | | Easily soluble | Yellow | 248.0 | 250.0 | 59.0 | 35.0 | | |
| 2 | Acetophenone | 1:1 | 165 | Insoluble | Yellow powder | 308.0 | 277.0 | 77.3 | 17.4 | 83.0 | 82.3 |
| 2 | Dimethylformamide | | 160 not sharp | Easily soluble | Yellow-orange amorphous | 261.0 | 257.0 | 86.65 | 50.9 | 85.65 | 79.4 |
| 2 | Acetic acid ethyl ester | 1:1 | 111 | do | Colorless crystalline | 138.0 | 188.9 | 71.5 | | 60.8 | |
| 2 | Dioxane | 1:1 | 110 | do | Yellowish crystalline | 276.0 | 271.0 | 6.29 | 6.3 | | |
| 2 | Tetrahydrofuran | 1:1 | 150 | do | Colorless, crystalline | 260.0 | 261.0 | 55.7 | 5.3 | | |
| 1 | Acetone | 1:1 | 148 | do | Colorless amorphous | 116.0 | 112.5 | 61.4 | 24.4 | 39.9 | 39.8 |
| 6 | Tetrahydrofuran | 1:1 | | do | Red-orange powder | 127.0 | 129.6 | 29.2 | 4.6 | 68.8 | 48.7 |
| 6 | Dioxane | 1:1 | | do | Brown, syrupy | 159.0 | 157.5 | 84.9 | 82.3 | 65.8 | 72.6 |
| 6 | Tetrahydrofuran | 1:1 | | do | do | 151.0 | 146.5 | 75.2 | 41.2 | 66.9 | 59.2 |
| 4 | Dimethylphosphite | 1:1 | | do | Brown amorphous | P calc., 9.03 P found, 9.84 | | 64.0 | 24.7 | 80.9 | 69.3 |
| 22 | Acetone | 1:2 | 120 | do | Yellowish crystalline | 146.2 | 145.2 | 86.4 | | 76.8 | |
| 22 | Dioxane | 1:1 | 80 | do | do | 130.0 | 130.8 | 80.8 | | 74.8 | |

Abbreviations: e.s.=easily soluble; ins.=insoluble; w.s.=water soluble; C.K.=completely killed.

What is claimed is:
1. Compounds of the formula:

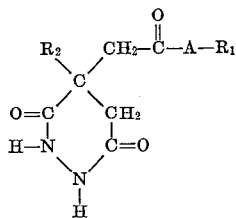

wherein: $R_2$ is a member selected from the group consisting of hydrogen, hydroxy and -acetyloxy, -n-propionyloxy, -isobutyroyloxy, -n-valeroyloxy, -iso-valeroyloxy, -acryloyloxy, -crotonoyloxy, -benzoyloxy, -o-chlorobenzoyloxy, -cinnamoyloxy, -crotonoyloxy, -succionoyloxy; $R_1$ is a member selected from the group consisting of hydrogen and alkyl having up to about 6 carbon atoms; A is selected from the group consisting of oxygen and —NH—; and wherein $R_1$ and $R_2$ can together be a methylenoxy group.

2. Compounds as claimed in claim 1 in any of their tautomeric enol forms.

3. Compound as claimed in claim 1, wherein $R_1$ and $R_2$ are hydrogen and A is oxygen.

4. Compound as claimed in claim 1, wherein $R_1$ is methyl, $R_2$ is hydrogen and A is oxygen.

5. Compound as claimed in claim 1, wherein $R_1$ is hydrogen, $R_2$ is hydroxyl and A is oxygen.

6. Compound as claimed in claim 1, wherein $R_1$ is methyl, $R_2$ is hydroxyl and A is oxygen.

7. Compound as claimed in claim 1, wherein $R_1$ is ethyl, $R_2$ is hydroxyl and A is oxygen.

8. Compound as claimed in claim 1, wherein $R_1$ is hydrogen, $R_2$ is acetyloxy and A is oxygen.

9. Compound as claimed in claim 1, wherein $R_1$ is hydrogen, $R_2$ is n-propionyloxy, and A is oxygen.

10. Compound as claimed in claim 1, wherein $R_1$ is hydrogen, $R_2$ is isobutyroyloxy and A is oxygen.

11. Compound as claimed in claim 1, wherein $R_1$ is hydrogen, $R_2$ is n-valeroyloxy and A is oxygen.

12. Compound as claimed in claim 1, wherein $R_1$ is hydrogen, $R_2$ is iso-valeroyloxy and A is oxygen.

13. Compound as claimed in claim 1, wherein $R_1$ is hydrogen, $R_2$ is acryloyloxy and A is oxygen.

14. Compound as claimed in claim 1, wherein $R_1$ is hydrogen, $R_2$ is crotonoyloxy and A is oxygen.

15. Compound as claimed in claim 1, wherein $R_1$ is hydrogen, $R_2$ is benzoyloxy and A is oxygen.

16. Compound as claimed in claim 1, wherein $R_1$ is hydrogen, $R_2$ is o-chlorobenzoyloxy and A is oxygen.

17. Compound as claimed in claim 1, wherein $R_1$ is hydrogen, $R_2$ is cinnamoyloxy and A is oxygen.

18. Compound as claimed in claim 1, wherein $R_1$ is methyl, $R_2$ is acetyloxy and A is oxygen.

19. Compound as claimed in claim 1, wherein $R_1$ is n-butyl, $R_2$ is acetyloxy and A is oxygen.

20. Compound as claimed in claim 1, wherein $R_1$ is amyl, $R_2$ is acetyloxy and A is oxygen.

21. Compound as claimed in claim 1, wherein $R_1$ is methyl, $R_2$ is crotonoyloxy and A is oxygen.

22. Compound as claimed in claim 1, having a structural formula:

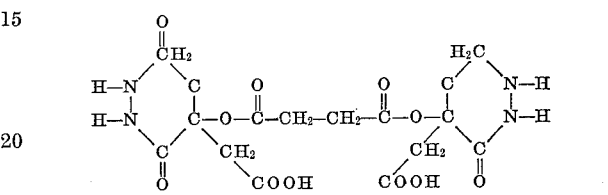

23. Compound as claimed in claim 1, wherein $R_1$ and $R_2$ taken together are methyleneoxy and A is oxygen.

24. Compound as claimed in claim 1, wherein A is —NH—, $R_1$ is hydrogen and $R_2$ is hydroxy.

25. Compounds as claimed in claim 1 in salt form having as cation at least one member selected from the group consisting of alkali metals, alkaline earth metals, ammonium, primary amines, secondary amines, tertiary amines, alkanol amines, copper, nickel, lead and mercury.

26. Adducts of the compounds claimed in claim 1 and at least one addition agent selected from the group consisting of hydrochloric acid, acetic acid, trichloracetic acid, aminoacetic acid, aminosulfonic acid, silicic acid, paraldehyde, propionaldehyde, benzaldehyde, acetone, acetophenone, dimethyl formamide, acetic acid ethyl ester, dioxane, tetrahydrofuran, and dimethylphosphite.

References Cited

Mizzoni et al.: C. T. 49, 5488b (1955), abstract of J. Am. Chem. Soc. 76, pp. 2201–3 (1954).

Elderfield: vol. 6 of Heterocyclic Compounds, Wiley Pub., 1957, pp. 126–127.

R. V. RUSH, Primary Examiner

ALEX MAZEL, Assistant Examiner

U.S. Cl. X.R.
71—92; 260—242

PO-1050
(5/69)

UNITED STATES PATENT OFFICE
CERTIFICATE OF CORRECTION

Patent No. 3,491,095      Dated January 20, 1970

Inventor(s) KURT KNOEVENAGEL and ROLF HIMMELREICH

It is certified that error appears in the above-identified patent and that said Letters Patent are hereby corrected as shown below:

Column 1, line 48, last line of Abstract of the Disclosure, add --These compounds are useful as plant growth inhibitors.--; column 5, line 54, "difficulty" should be --difficultly--; column 5, line 66, "difficulty" should be--difficultly--; column 9, line 43, "130° C." should be --134° C.--; column 12, Table 1, under the heading "Equivalent weight (titration with acid)" 4th line in last column, "Found, 9" should be --Found, 94--; column 13, Table 3, last item under the heading "Oats, 28 days" "6.92" should be --69.2--

SIGNED AND
SEALED
JUL 21 1970

(SEAL)
Attest:

Edward M. Fletcher, Jr.
Attesting Officer

WILLIAM E. SCHUYLER, JR.
Commissioner of Patents